United States Patent [19]
Blackwelder et al.

[11] Patent Number: 6,074,678
[45] Date of Patent: Jun. 13, 2000

[54] PLASTIC SHEET BASE FOR PACKAGING BACON

[75] Inventors: Maurice W. Blackwelder; Louis M. DiBello, both of Bardstown, Ky.

[73] Assignee: Owens-Illinois Labels Inc., Toledo, Ohio

[21] Appl. No.: 09/046,843

[22] Filed: Mar. 10, 1998

[51] Int. Cl.[7] .............................. B29C 65/54; B32B 5/14; B32B 7/02; B65D 85/00

[52] U.S. Cl. ..................... 426/129; 156/182; 156/244.11; 156/244.16; 156/244.19; 206/459.5; 206/497; 428/218; 428/308.4; 428/316.6; 428/317.1; 428/317.7; 428/318.6; 428/319.9

[58] Field of Search .................................. 428/218, 308.4, 428/316.6, 317.1, 317.7, 318.6, 319.9; 156/182, 244.11, 244.16, 244.19; 426/129; 206/459.5, 497

[56] References Cited

U.S. PATENT DOCUMENTS

| | | | |
|---|---|---|---|
| 2,465,841 | 3/1949 | Bonini | 426/129 X |
| 3,264,120 | 8/1966 | Westcott | 99/174 |
| 3,274,004 | 9/1966 | Curler et al. | 156/244.11 X |
| 3,360,119 | 12/1967 | Mullinix | 206/459.5 X |
| 3,520,769 | 7/1970 | Baker | 428/308.4 |
| 3,755,063 | 8/1973 | Massey et al. | 428/316.6 X |
| 3,803,332 | 4/1974 | Seiferth et al. | 426/121 |
| 3,861,994 | 1/1975 | Stark | 428/318.6 X |
| 3,978,260 | 8/1976 | Dobbins et al. | 428/204 |
| 4,552,789 | 11/1985 | Winchell | 428/132 |
| 4,721,643 | 1/1988 | Harayama et al. | 428/316.6 X |
| 5,082,608 | 1/1992 | Karabedian et al. | 264/46.1 |
| 5,443,769 | 8/1995 | Karabedian et al. | 264/46.1 |
| 5,520,939 | 5/1996 | Wells | 426/129 |
| 5,674,602 | 10/1997 | Karabedian et al. | 428/304.4 |

Primary Examiner—Richard D. Lovering

[57] ABSTRACT

A plastic sheet for packaging meat products such as bacon that consists essentially of a laminate of first and second sheet substrates. The first substrate is a coextruded polystyrene substrate that consists of a non-foam layer and a foam layer that is thinner than the non-foam layer. The second substrate is a coextruded polystyrene substrate that consists of a non-foam layer and a foam layer that is thicker than the non-foam layer. The first and second substrates are secured to each other with the foam layers facing each other. The first substrate provides toughness and a smooth surface for printing information to be visible within the meat product package, and the second substrate provides stiffness at light weight.

23 Claims, 2 Drawing Sheets

PLASTIC SHEET BASE FOR PACKAGING BACON

The present invention is directed to the packaging of moist and greasy meat products such as bacon, and more particularly to an insert base of plastic composition that does not absorb fat and grease from the meat product.

BACKGROUND AND OBJECT OF THE INVENTION

It is conventional in the meat packaging industry to package meat products such as bacon on a semi-rigid insert base within a clear transparent overlayer. The insert base typically consists of a monolayer of unfoamed impact polystyrene, paperboard or polyethylene-coated paperboard. An unfoamed polystyrene monolayer insert has low stiffness properties, and is considered undesirable for this reason. Paperboard and polyethylene-coated paperboard inserts have been found to absorb meat fat around the die-cut edges of the insert, which makes the insert and package limp and unsightly. Paperboard also leaves paper fibers along the die-cut edges, which can adulterate the meat product. All of these problems are particularly acute in connection with the packaging of bacon specifically because of the high fat and grease content of the bacon.

It is therefore a general object of the present invention to provide an insert base for packaging meat products such as bacon that addresses and overcomes the deficiencies of conventional monolayer polystyrene and paperboard insert bases (coated or uncoated) as described above. A more specific object of the present invention is to provide an insert base of the described character that does not absorb bacon fat and the like, and that retains structural integrity and appearance during extended storage after packaging. A further object of the invention is to provide a package insert of the described character that is lighter in weight than conventional package inserts of the same size, thereby reducing transportation and handling costs. Yet another object of the present invention is to provide a method of manufacturing a plastic insert base having the desirable properties discussed immediately above, a method of packaging meat products on such a base, and a meat product package that includes such an insert base.

SUMMARY OF THE INVENTION

A plastic sheet for packaging meat products such as bacon in accordance with the present invention consists essentially of a laminate of first and second sheet substrates. The first substrate is a coextruded polystyrene substrate that consists of a non-foam layer and a foam layer that is thinner than the non-foam layer. The second substrate is a coextruded polystyrene substrate that consists of a non-foam layer and a foam layer that is thicker than the non-foam layer. The first and second substrates are secured to each other with the foam layers facing each other. The first substrate provides toughness and a smooth surface for printing information to be visible within the meat product package, and the second substrate provides stiffness at light weight.

The overall laminate in accordance with the present invention has a weight not greater than 31 pounds per thousand square feet, as compared with weight on the order of 40 and 50 pounds per thousand square feet for monolayer polystyrene and paperboard respectively. The laminate in accordance with the present invention has a product index, which is the product of caliper multiplied by density, of not greater than 400 milligrams (mgs) as compared with product indices on the order of 480 and over 600 for monolayer polystyrene and paperboard respectively. The density of the laminate in accordance with the present invention is in the range of 23 to 32 pounds per cubic foot, as compared with densities in the range of 55 to 64 pounds per cubic foot for polystyrene and paperboard. However, in spite of such lower weights and densities, the laminates in accordance with the present invention exhibit Gurley stiffness values greater than those of conventional polystyrene and comparable to those of paperboard sheets of similar thickness.

In the first substrate in accordance with the preferred embodiments of the invention, the solid or non-foam layer is primarily of high-impact polystyrene composition, while the foam layer is primarily of medium impact polystyrene composition. In the second substrate, both the solid or non-foam layer and the foam layer are primarily of crystal polystyrene composition. In the first substrate, the solid or non-foam layer is substantially thicker than the foam layer, such as about twice as thick. In the second substrate, the foam layer is substantially thicker than the non-foam layer, such as about twelve to twenty-three times as thick. The second substrate is substantially thicker than the first substrate, such as about two to four times as thick. Although substantially thinner, density of the first substrate is substantially higher than that of the second substrate, as on the order of two to four times as great. Specific thicknesses and densities may be tailored to provide stiffness and other properties desired by a customer.

A method of making a plastic sheet for packaging meat products in accordance with another aspect of the present invention contemplates coextruding the first and second polystyrene substrates as described above, and then laminating the substrates to each other by adhering the foam layers face to face with each other. The sheet is die cut to provide an insert, and then packaged with a meat product in facing engagement with the non-foam layer of the second substrate in the insert. Identifying indicia and product information may be printed on the non-foam layer of the first substrate prior to lamination to avoid crushing of the sheet after lamination.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENTS

Figure 1:
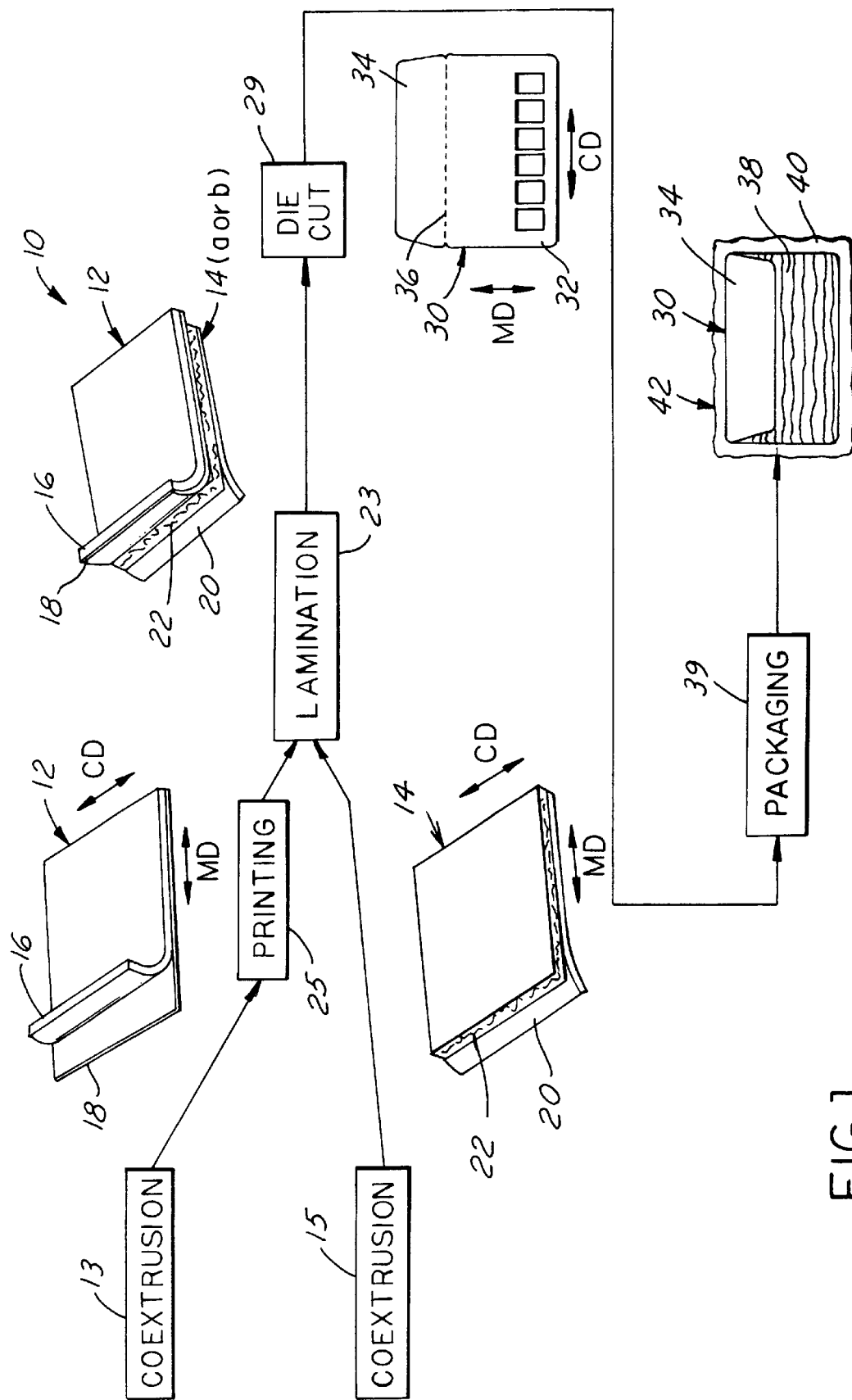
FIG. 1 is a flow chart that illustrates manufacture of plastic sheet insert blanks and packaging of meat products therewith in accordance with a presently preferred embodiment of the invention.

FIG. 1 illustrates a process for fabricating a plastic sheet 10 in accordance with a presently preferred embodiment of the invention, and then employing such sheet for packaging a meat product. In the fabrication of sheet 10, first and second substrates 12, 14 are fabricated by separate coextrusion processes 13, 15. These coextrusion processes may be as disclosed, for example, in U.S. Pat. Nos. 5,443,679 and 5,674,602, the disclosures of which are incorporated herein by reference. Substrate 12, 14, which are shown as segmented elements for purposes of illustration in FIG. 1, preferably are in roll sheet form at this stage. First substrate 12 preferably consists of a relatively thick solid or non-foam layer 16 secured by coextrusion to a thinner foam layer 18. Substrate 12 has a machine direction MD and a cross direction CD. Substrate 12 provides toughness and a smooth surface for printing. Second substrate 14 preferably consists of a thin solid or non-foam layer 20 secured by coextrusion to a thicker foam layer 22. Substrate 14 has a machine direction MD and a cross direction CD. Substrates 12, 14 are laminated at 23 to each other to provide sheet 10 by adhesively securing the foam layers 18, 22 in facing engagement with each other. In the laminate 10, the machine directions MD of the substrate are parallel, as are the cross directions CD. Substrate 14, which is thicker than substrate 12, provides the stiffness and weight characteristics desired by the customer. Where printed information is desired on the final die-cut product, such printing is applied at 25 to non-foam layer 16 of substrate 12 prior to lamination to prevent crushing of thicker substrate 14.

Plastic sheet substrates and laminations have been constructed in accordance with the present invention for comparison with conventional polystyrene and paperboard meat product insert bases. Two exemplary laminates consists of identical first substrates 12, and two second substrates 14 (hereinafter 14a and 14b) of differing compositions and constructions. In each example, substrate 12 had a non-foam layer or skin 16 of 2.35 mils thickness, which consisted of a blend of 85 weight percent high-impact polystyrene (Chevron 9400, Dow 484 or Novacor PS2312) with 15 weight percent white polystyrene concentrate (O'Neal 11-0518 or Polycom Huntsman 20172). Foam layer 18 had a thickness of 1.15 mils, and consisted of a blend of 90.5 weight percent medium impact polystyrene (Chevron 7034.01, Novacor PS2312 or Dow 425), 6 weight percent ethylene/propylene copolymer (Union Carbide DS6D82, Union Carbide DS6D21 or Montell SR-549M), 2 weight percent compatibilizing resin (Shell Kraton 1657S), and 1.50 weight percent blowing agent (Hydrocerol CF40S or Reedy's SAFOAM FP-40). The thin foam layer, reducing overall weight and density, enables this substrate to be wound into rolls without gauge bands. Total thickness or caliper was 3.5 mils, and total density was 55.2 lb/cu ft.

In one embodiment, the second substrate 14a had a thin non-foam or skin layer 20 of 0.5 ml, and consisted of a blend of 78 weight percent crystal polystyrene (Dow 675 or Huntsman 203), 10 weight percent ethylene/propylene copolymer (Union Carbide DS6D82, Union Carbide DS6D21 or Montel SR-549M), 5 weight percent compatibilizing resin (Shell Kraton 1657S), and 7 weight percent yellow polystyrene pigment concentrate (O'Neal 0510-753, Ampacet LP-20753 or Techmer PMS-115161D). Foam layer 22 had a thickness of 6.25 mil, and consisted of a blend of 99.6 weight percent crystal polystyrene (Huntsman 205 or Dow 70268), 0.4 weight percent nucleating agent (Hydrocerol CF40S or Reedy's Safoam FP40), and a carbon dioxide gas blowing agent. Total thickness or caliper was 6.75 mil, and total density was 20.0 lb/cu ft.

In the other embodiment, the second substrate 14b was coextruded to be stiffer than substrate 14a in the first embodiment. Substrate 14b had a non-foam or skin layer 20 of 0.5 mil thickness, which consisted of a blend of 93 weight percent crystal polystyrene (Dow 675 or Huntsman 203), and 7 weight percent yellow polystyrene pigment concentrate (O'Neal 0510-753, Ampacet LP-20753 or Techmer PMS-115161D). Foam layer 22 had a thickness LD of 11.75 mil, and consisted of a blend of 99.2 weight percent crystal polystyrenes (Dow 685 and Huntsman 205, or Huntsman 202 and Dow 70268), 0.8 weight percent nucleating agent (Hydrocerol CF40S or Reedy's Safoam FP-40), and a carbon dioxide gas blowing agent. Total thickness or caliper was 12.25 mil, and total density was 14.3 lb/cu ft. Substrate 12 was laminated to substrate 14a or 14b with a solventless polyurethane adhesive (Morton's 403A/C83, Morton's 403A/C411, Liofol's 7979/7279 or Century's C8610/C8210) to provide the desired stiffness required by a given customer.

The following table lists various properties of the two laminates 12, 14a and 12, 14b in accordance with these specific examples of the present invention, in comparison to various conventional paperboard and monolayer polystyrene bacon package insert blanks in accordance with the prior art:

TABLE A

| Example | Material | Gurley Stiffness (mgs) MD | CDS | Caliper mils | Density lbs/cuft. | PI ** | Lbs/MSF *** |
|---|---|---|---|---|---|---|---|
| Example 1 | Polystyrene | 560 | 610 | 7.6 | 63.0 | 478.7 | 40 |
| Example 2 | polystyrene | 650 | 610 | 7.8 | 62.0 | 483.9 | 40 |
| Example 3 | Paperboard | 2608 | 1422 | 11.6 | 55.8 | 648.2 | 54 |
| Example 4 | paperboard | 2548 | 1215 | 10.2 | 63.5 | 650.4 | 54 |
| Example 5 | paperboard | 2450 | 1410 | 9.6 | 63.8 | 612.2 | 51 |
| Substrate 12 | | 40 | 30 | 3.5 | 55.2 | | |
| Substrate 14a | | 195 | 90 | 6.75 | 20.0 | | |
| Substrate 14b | | 830 | 380 | 12.25 | 14.3 | | |
| Laminated Substrates 12, 14a | | 870 | 580 | 10.3 | 32.0 | 328.2 | 27 |
| Laminated Substrates 12, 14b | | 2210 | 1380 | 15.8 | 23.4 | 368.4 | 31 |

**Product index - the product of caliper and density in mgs - useful to compare mass of materials having different caliper and density values. The weight of a test square of material cut exactly 1.9518 × 1.9518 inches is equal in milligrams (mgs) to the product of the caliper in mils multiplied by the density in lbs/cuft.
***The product index value divided by 12 yields the weight in lbs./thousand sq. ft.

It will be noted that the laminate of substrates 12, 14a exceeded the stiffness values of existing polystyrene inserts at a weight reduction of about 33%. The laminate of substrates 12, 14b provide Gurley stiffness values comparable to those of paperboard at a 43% weight reduction. These weight reductions are advantageous to packagers in reducing costs of both transportation and handling. The test results of Table A illustrate that while neither substrate 12 nor substrate 14a or 14b alone achieves the desired Gurley stiffness, following lamination the stiffness of the composite laminate is greatly enhanced. This enhancement is greater than the sum of the stiffnesses of the individual substrate components, and greater than expected due to lamination of the substrates.

Figure 2:
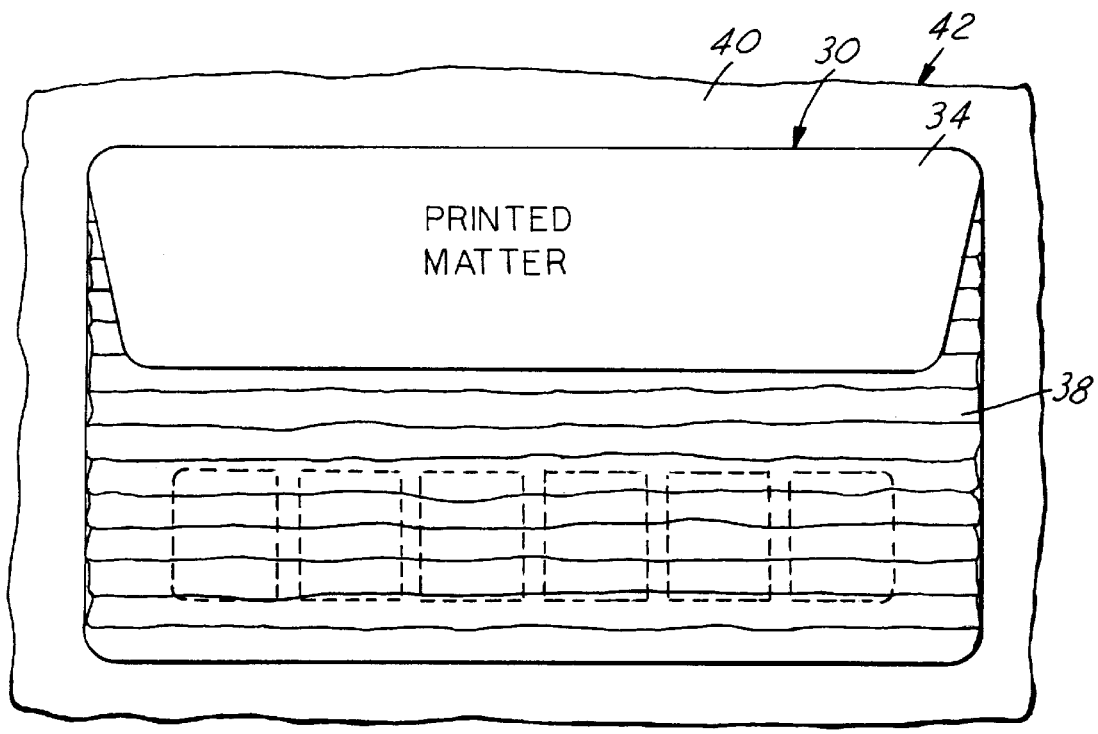
FIGS. 2 and 3 are top and bottom plan views of the meat product package resulting from the process of FIG. 1.
Figure 3:
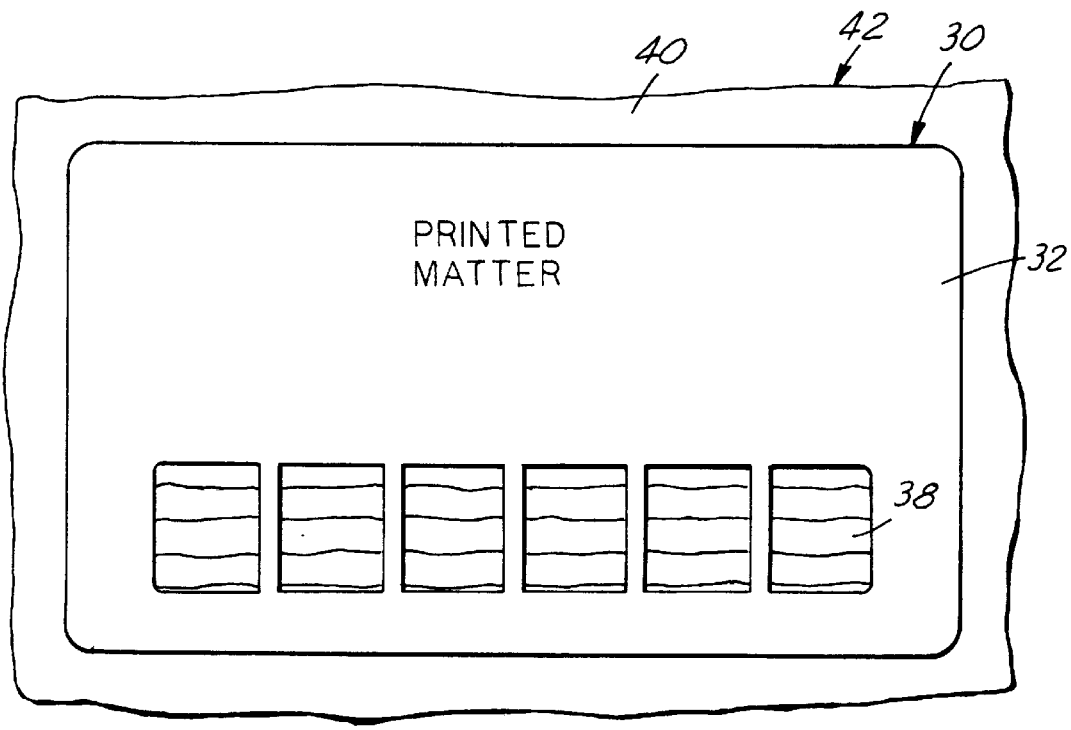

Returning again to FIG. 1, following lamination of the substrates at 23, laminated sheet 10 is die cut at 29 to provide a package base or insert 30 of geometry desired by the packager. In the specific example illustrated in FIG. 1, insert 30 has a generally rectangular body 32 with an integral flap 34 connected thereto by a weakened line of serrations 36 for folding in the package assembly. In this particular embodiment, the cross direction CD is oriented lengthwise of the insert 30, while the machine direction MD extends across the insert. The inserts 30 are then individually packaged with a slab 38 of meat product such as bacon, with slab 38 being disposed on body 32 and flap 34 folded thereover. The entire package 42 (FIGS. 1–3) is enclosed at 39 within a heat-shrunk transparent wrap 40 to allow the meat product and the printing on insert 30 to be visible to a customer. Fat and grease from the meat product does not absorb into the die-cut edges of insert 30, as occurs with the paperboard insert of the prior art.

Where flap 34 is folded over slab 38, it is important that the flap not spring back to an angle greater than 45° with respect to the plane of body 32 to facilitate application of film 40. The laminated structure of insert 30 has a higher degree of orientation in the machine direction MD than in the cross direction CD. The desired deadness of the fold is achieved by cutting insert 30 with cross direction CD parallel to the fold line. Serrations 36 at the fold line are cut from the printed side of substrate 12—i.e., into non-foam layer 16. This helps prevent a serration edge bead from puncturing overwrap 40.

There is thus provided a plastic sheet for packaging meat products, a method of fabrication and packaging, and a resulting package, that fully satisfy all of the aims and objectives set forth above. In particular, the plastic sheet and insert of the present invention exhibit stiffnesses comparable to those of conventional inserts at significant weight reduction, and therefore significant reduction in packaging cost. Furthermore, the plastic sheet inserts fabricated in accordance with the present invention do not absorb meat fat and grease along the die cut edges, and thus do not lose stiffness properties and become unsightly as do the constructions of the prior art.

We claim:

1. A plastic sheet for packaging meat products that consists essentially of a laminate of first and second substrates,
    said first substrate being a coextruded polystyrene substrate that consists of a non-foam layer and a foam layer that is thinner than said non-foam layer,
    said second substrate being a coextruded polystyrene substrate that consists of a non-foam layer and a foam layer that is thicker than said non-foam layer,
    said first and second substrates being secured to each other with said foam layers facing each other, said first substrate providing toughness and a smooth surface for printing and said second substrate light weight and stiffness.

2. The sheet set forth in claim 1 wherein said laminate has a weight of not greater than 35 pounds per thousand square feet.

3. The sheet set forth in claim 1 wherein said laminate has a product of caliper and density not greater than 400 mgs.

4. The sheet set forth in claim 1 wherein said laminate has a density of not greater than 32 pounds per cubic foot.

5. The sheet set forth in claim 1 further comprising printing on said non-foam layer of said first substrate.

6. The plastic sheet set forth in claim 1 wherein said non-foam layer of said first substrate comprises a blend of high impact polystyrene and a polystyrene concentrate.

7. The plastic sheet set forth in claim 6 wherein said foam layer of said first substrate comprises a blend of medium impact polystyrene, an ethylene/propylene copolymer, and a compatibilizing resin.

8. The plastic sheet set forth in claim 7 wherein said first substrate comprises a total thickness of about 3.5 mil and a total density of about 55.2 lb/cu. ft.

9. The plastic sheet set forth in claim 8 wherein said non-foam layer of said first substrate has a thickness of about 2.35 mil and said foam layer of said first substrate has a thickness of about 1.5 ml.

10. The plastic sheet set forth in claim 1 wherein said non-foam layer of said second substrate comprises a blend of crystal polystyrene, an ethylene/polypropylene copolymer, a compatibilizing resin and a color pigment.

11. The plastic sheet set forth in claim 10 wherein the foam layer of said second substrate comprises a blend of crystal polystyrene and a plasticizer.

12. The plastic sheet set forth in claim 11 wherein said second substrate has a total thickness of about 6.75 mil and a total density of about 20.0 lb/cu. ft.

13. The plastic sheet set forth in claim 11 wherein said second substrate has a total thickness of about 12.25 mil and a total density of about 14.3 lb/cu. ft.

14. The plastic sheet set forth in claim 1 further comprising an adhesive securing said first and second substrates to each other.

15. The plastic sheet set forth in claim 14 wherein said adhesive comprises a solventless polyurethane.

16. A method of making a plastic sheet for packaging meat products that comprises the steps of:
    (a) coextruding a first polystyrene substrate that consists of a non-foam layer and a foam layer that is thinner than said non-foam layer,
    (b) coextruding a second polystyrene substrate that consists of a non-foam layer and a foam layer that is thicker than said non-foam layer, said second substrate being thicker than said first substrate, and
    (c) laminating said first and second substrates to each other by adhering said foam layers face-to-face with each other.

17. The method set forth in claim 16 comprising the additional step of: (d) die cutting said sheet to provide an insert for a meat-product package.

18. The method set forth in claim 17 comprising the additional step of: (e) packaging a meat product with said insert, with the meat product in facing engagement with the non-foam layer of said second substrate in said insert.

19. The method set forth in claim 18 comprising the additional step, prior to said step (c), of: (f) printing indicia onto said non-foam layer of said first substrate.

20. The method set forth in claim 16 wherein said laminate has a weight of not greater than 35 pounds per thousand square feet.

21. The method set forth in claim 16 wherein said laminate has a product of caliper and density not greater than 400 mgs.

22. The method set forth in claim 16 wherein said laminate has a density of not greater than 32 pounds per cubic foot.

23. A meat product package that comprises:

a sheet insert, a meat product disposed on said sheet insert, and a clear wrap securing said meat product onto said sheet insert, said sheet insert comprising a lamination of first and second substrates, said first substrate being a coextruded polystyrene substrate that consists of a a non-foam layer and a foam layer that is thinner than said non-foam layer, and said second substrate being a coextruded polystyrene substrate that consists of a non-foam layer and a foam layer that is thinner than said non-foam layer, said first and second substrates being secured to each other with said foam layers facing each other, said first substrate providing toughness and a smooth surface for printing and said second substrate light weight and stiffness.

* * * * *